(12) United States Patent
Weisman-Smith et al.

(10) Patent No.: US 12,065,101 B2
(45) Date of Patent: Aug. 20, 2024

(54) AUTHENTICATION OF A DRIVER OF A VEHICLE FOR A VEHICLE EXPERIENCE

(71) Applicant: Capital One Services, LLC, McLean, VA (US)

(72) Inventors: Tiana Weisman-Smith, Plano, TX (US); Bryan Parker, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 82 days.

(21) Appl. No.: 17/449,158

(22) Filed: Sep. 28, 2021

(65) Prior Publication Data

US 2023/0098405 A1 Mar. 30, 2023

(51) Int. Cl.
*B60R 25/24* (2013.01)
*G07C 5/08* (2006.01)

(52) U.S. Cl.
CPC ............ *B60R 25/241* (2013.01); *G07C 5/085* (2013.01); *B60R 2325/108* (2013.01)

(58) Field of Classification Search
CPC . B60R 25/241; B60R 2325/108; G07C 5/085; G07C 9/00571; G07F 17/0057; G07B 15/00; G06F 21/31
See application file for complete search history.

(56) References Cited

U.S. PATENT DOCUMENTS

| | | | | |
|---|---|---|---|---|
| 10,147,253 B1* | 12/2018 | Proefke | .............. | G07C 9/00571 |
| 11,042,816 B2* | 6/2021 | Zaid | ...................... | H04W 12/50 |
| 2003/0047613 A1* | 3/2003 | Funamoto | ............ | G06Q 20/341 |
| | | | | 235/462.01 |
| 2011/0099036 A1* | 4/2011 | Sarkissian | .............. | G06Q 10/02 |
| | | | | 705/5 |
| 2011/0288891 A1* | 11/2011 | Zaid | ........................ | G06Q 40/08 |
| | | | | 705/26.4 |
| 2014/0278608 A1* | 9/2014 | Johnson | ................... | B60R 25/24 |
| | | | | 705/5 |
| 2016/0352715 A1 | 12/2016 | Saini et al. | | |
| 2017/0169398 A1* | 6/2017 | Washington | ........... | G06Q 10/08 |
| 2018/0247469 A1 | 8/2018 | Cacabelos et al. | | |
| 2019/0092279 A1* | 3/2019 | Jarvis | .................. | G06Q 20/3823 |
| 2019/0268333 A1* | 8/2019 | Willmann | ............. | H04L 9/0643 |
| 2021/0039596 A1* | 2/2021 | Park | ........................ | B60R 25/23 |
| 2021/0073825 A1* | 3/2021 | Walling | ................. | G06Q 10/10 |
| 2021/0114558 A1* | 4/2021 | Cheng | ................. | H04W 12/069 |

* cited by examiner

Primary Examiner — Yong Hang Jiang
(74) Attorney, Agent, or Firm — Harrity & Harrity, LLP (57) ABSTRACT

In some implementations, a system may receive, from a user device, a service request for a vehicle experience. The system may obtain qualification information associated with the driver. The system may provide, based on the qualification information and to the user device, a verification code for authenticating a driver for the vehicle experience. The system may provide a notification that indicates that the driver requested the vehicle experience. The notification may include driver information and vehicle information associated with a vehicle involved in the vehicle experience. The system may authenticate, based on scan data of the verification code, the driver for the vehicle experience. The scan data may be received from an agent device that is associated with the location management system. The system may provide authentication information to the agent device to facilitate authentication of the driver for the vehicle experience.

20 Claims, 6 Drawing Sheets

AUTHENTICATION OF A DRIVER OF A VEHICLE FOR A VEHICLE EXPERIENCE

BACKGROUND

A vehicle experience may provide an individual, such as a driver, access to a vehicle for a period of time to permit the individual to review the vehicle. For example, prior to leasing or purchasing a vehicle, an individual may have access to the vehicle, via a test drive, to review the vehicle and/or confirm whether the vehicle satisfies the individual's expectations. Additionally, or alternatively, a vehicle experience may involve a driver gaining rental access to a vehicle and/or recreational access to a vehicle for a limited period of time.

SUMMARY

In some implementations, a system for authenticating a driver for a vehicle experience includes one or more memories and one or more processors, communicatively coupled to the one or more memories, configured to: receive, from a user device, a service request associated with the driver and a vehicle, wherein the service request includes driver information associated with the driver and vehicle information associated with the vehicle; provide a verification code to the user device that is associated with the driver and vehicle; identify, based on the vehicle information, a location management system that is associated with the vehicle; provide, to the location management system, a notification that indicates that the driver requested the vehicle experience, wherein the notification includes the driver information and the vehicle information; receive, from an agent device associated with the location management system, an authentication request associated with a scan of the verification code by the agent device; authenticate the driver for the vehicle experience based on the authentication request including scan data associated with the verification code; and provide, to the agent device, the driver information to the agent device to facilitate authentication of the driver for the vehicle experience.

In some implementations, a non-transitory computer-readable medium storing a set of instructions includes one or more instructions that, when executed by one or more processors of a device, cause the device to: receive a service request associated with a vehicle, wherein the service request includes driver information associated with a driver and vehicle information associated with the vehicle; provide, to a user device associated with the driver, a verification code for authorizing a vehicle experience involving the driver and the vehicle; provide, to a location management system associated with the vehicle, a notification that indicates that the driver requested the vehicle experience, wherein the notification is provided to the location management system based on the vehicle information indicating that the vehicle is associated with the location management system; receive, from an agent device associated with the location management system, scan data associated with a scan of the verification code by the agent device; and provide, to the agent device and based on the scan data being associated with the verification code, the driver information to the agent device to facilitate authentication of the driver.

In some implementations, a method for authenticating a driver for a vehicle experience includes receiving, from a user device, a service request for a vehicle experience; obtaining, based on driver information in the service request, qualification information associated with the driver; providing, based on the qualification information and to the user device, a verification code for authenticating a driver for the vehicle experience; providing, by the device to a location management system associated with the vehicle, a notification that indicates that the driver requested the vehicle experience, wherein the notification includes the driver information and vehicle information associated with a vehicle involved in the vehicle experience; authenticating, based on scan data of the verification code, the driver for the vehicle experience, wherein the scan data is received from an agent device that is associated with the location management system; and providing, by the device to the agent device, authentication information to the agent device to facilitate authentication of the driver for the vehicle experience.

DETAILED DESCRIPTION

The following detailed description of example implementations refers to the accompanying drawings. The same reference numbers in different drawings may identify the same or similar elements.

A test drive typically involves an individual requesting a seller (e.g., an individual or organization, such as a manufacturer, dealer, or other entity that sells vehicles) to allow the individual to drive a vehicle for a period of time and accessing the vehicle from a location of the seller. For example, a consumer may arrive at a dealership and request the dealership to authorize the test drive. The dealership may determine whether to authorize the test drive based on whether the consumer is qualified to the drive the vehicle (e.g., based on whether the consumer has a driver license to drive a type of the vehicle and/or insurance coverage to drive the vehicle).

However, a consumer may be unable to travel to the dealership when the consumer wants to test drive the vehicle. In such a case, a representative of the dealership may pick up the consumer for the test drive (with the requested vehicle or another vehicle), return to the dealership to qualify the driver for the test drive, and enable the consumer to test drive the vehicle from the dealership. Such an experience involves multiple trips to and/or from the dealership for the consumer, representative, and/or the vehicle. Furthermore, in such a case, security may be a concern due to the nature of the interaction and/or the relatively high value of the vehicle. Accordingly, to confirm that the consumer that requested the test drive is actually the consumer that is brought to the dealership for the test drive (e.g., in the interest of protecting the representative and preventing fraud), the representative may authenticate the consumer via a driver license or other form of identification.

Because malicious individuals can relatively easily falsify an identification, such an authentication process can be unreliable.

Some implementations described herein provide a vehicle experience system that enables a consumer (e.g., a driver) and/or an agent (e.g., an individual associated with a dealership or other type of seller) to engage in a vehicle experience (e.g., a test drive) involving a vehicle without the consumer having to access the vehicle from a location of a dealership. For example, the vehicle experience system may receive a service request for a vehicle experience involving a vehicle, identify a system associated with the vehicle (e.g., a location management system that manages an inventory of a dealership associated with the vehicle), and schedule the vehicle experience with the system. Furthermore, the vehicle experience system may authenticate the vehicle experience and/or the driver via a verification code that can be generated based on specific information associated with the driver and/or the requested vehicle experience. As described herein, the verification code may provide enhanced security over an identification-based authentication. In some implementations, the vehicle experience system may be configured to qualify the driver for the vehicle experience system based on qualification information (e.g., driver license information, vehicle insurance information, background information, financial information, and/or another type of qualification information) associated with the driver. The driver may be a consumer seeking to purchase or lease the vehicle and/or a user of the vehicle experience system that does not own the vehicle at the time of a vehicle experience.

In this way, the vehicle experience system may securely facilitate a vehicle experience at a remote location from a dealership location or other location associated with a vehicle involved in the vehicle experience. Accordingly, the vehicle experience system may prevent fraud, provide flexibility and efficient scheduling of vehicle experiences for consumers and/or dealerships, and enhance a consumer experience involved in test driving a vehicle or engaging in other types of vehicle experiences, such as viewing a vehicle and/or testing features of the vehicle without test driving the vehicle, among other examples.

Figure 1A:
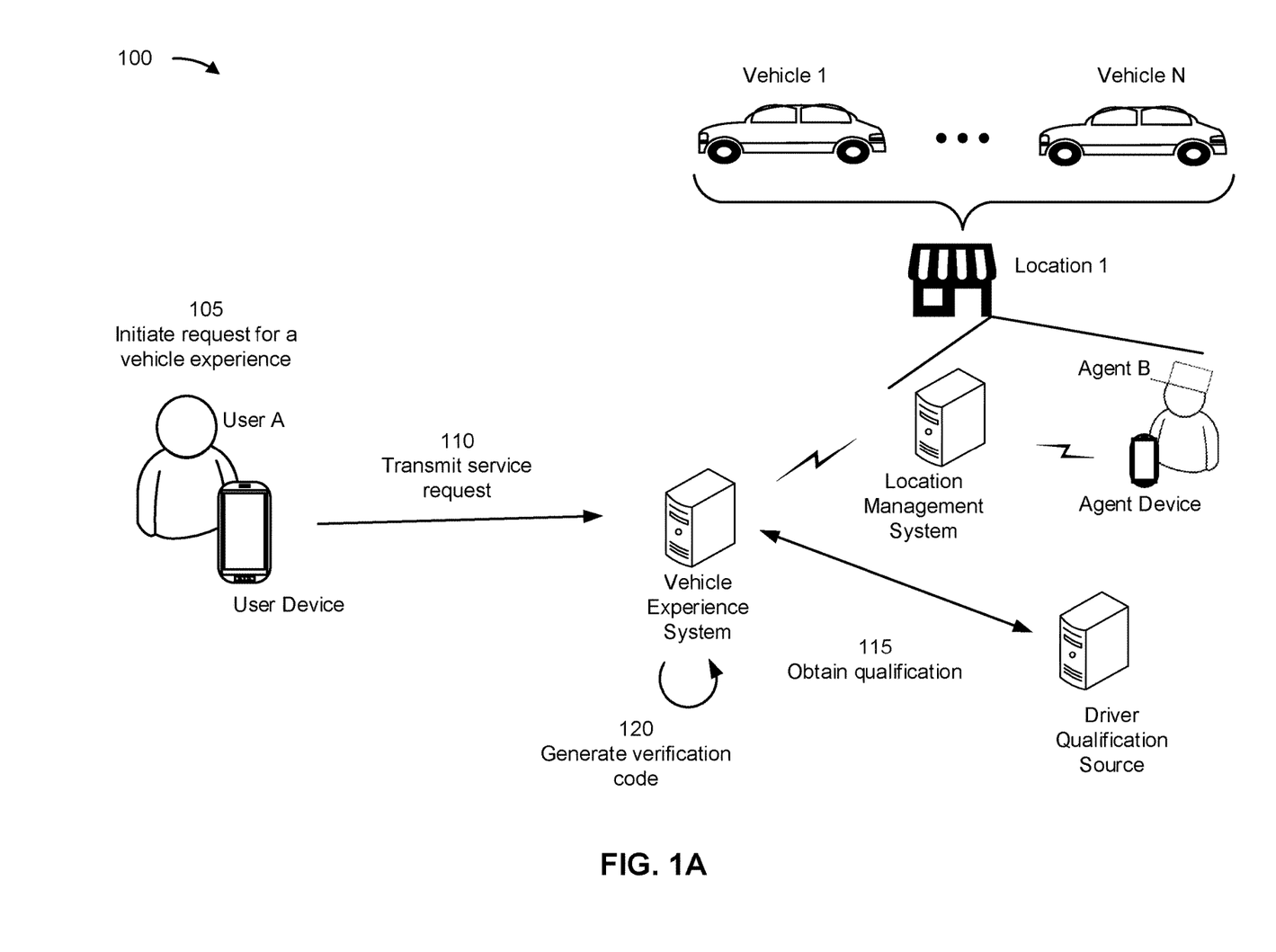
FIGS. 1A-1C are diagrams of an example implementation relating to authentication of a driver of a vehicle for a vehicle experience.
Figure 1B:
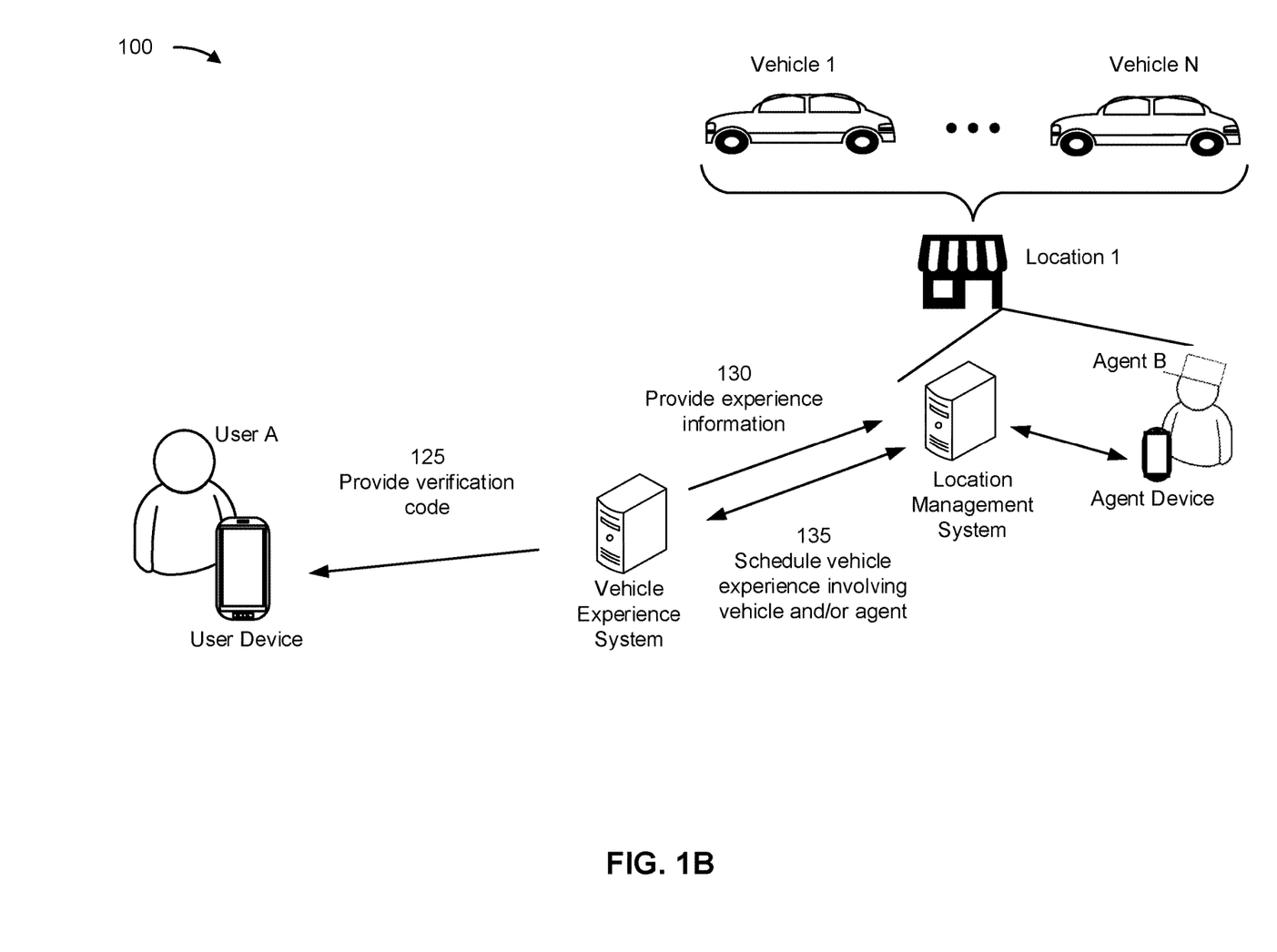
Figure 1C:
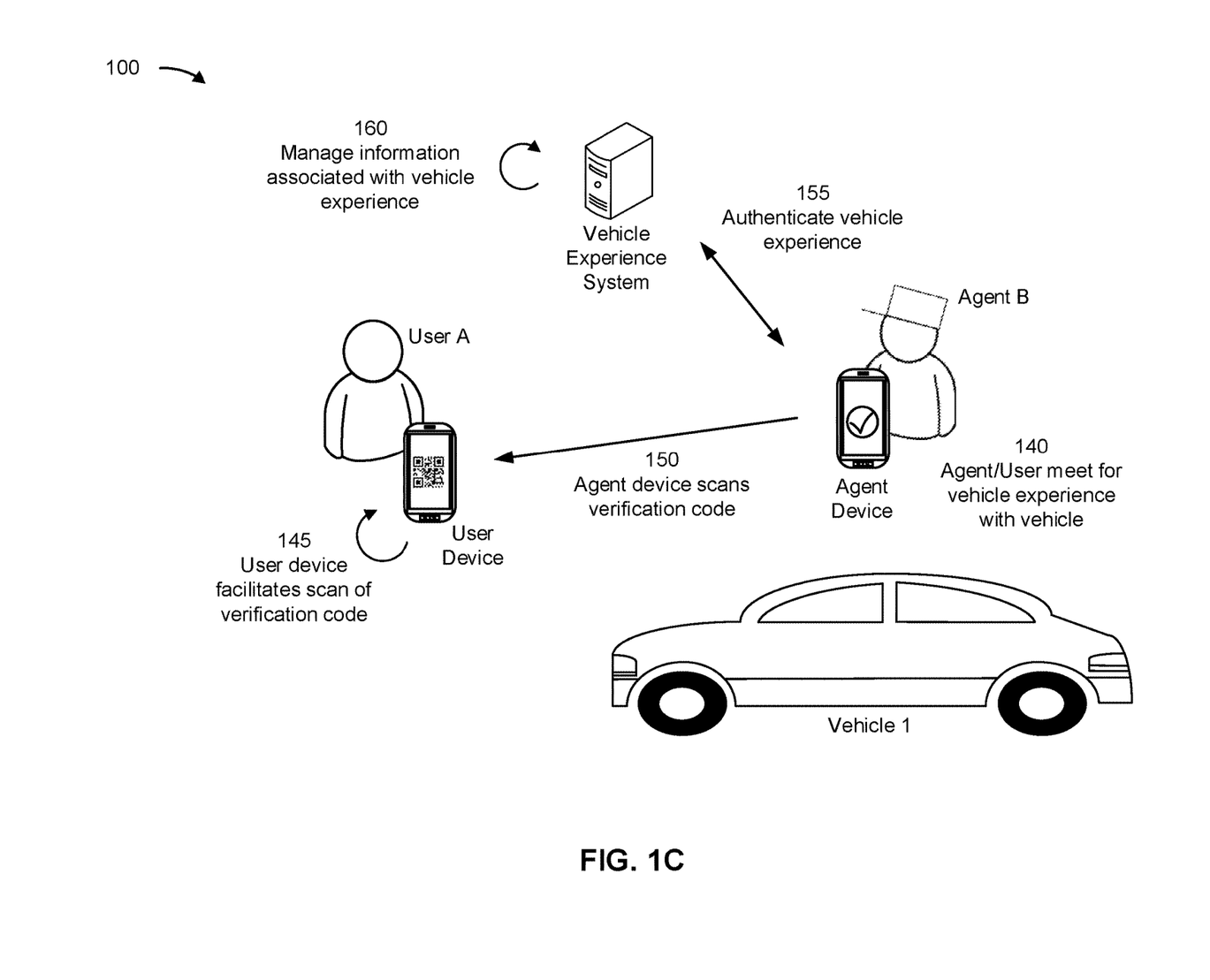

FIGS. 1A-1C are diagrams of an example implementation 100 associated with authentication of a driver of a vehicle for a vehicle experience. As shown in FIGS. 1A-1C, example implementation 100 includes a vehicle experience system, a user device associated with a user (User A), a location management system associated with a vehicle location (Location 1), a driver qualification source, and an agent device associated with an agent (Agent B). These systems and/or devices are described in more detail below in connection with FIG. 2 and FIG. 3.

In example implementation 100, the user may be qualified as a driver for a test drive at a location that is separate or remote from the vehicle location. The agent may be a representative (e.g., a sales representative and/or a customer service representative) of an entity (e.g., a dealership) that owns and/or operates the vehicle location and/or the vehicle. Accordingly, the agent may be authorized, via the agent device and/or by the entity, to enable the user to be involved in a vehicle experience with a vehicle. Although example implementation 100 is described in connection with a vehicle experience that may involve a test drive of a vehicle, example implementation 100 may include or involve other types of vehicle experiences.

As shown in FIG. 1A, and by reference number 105, the user initiates a request for a vehicle experience. For example, the user may initiate a service request via the user device and/or an application of the user device. The application may be associated with the vehicle experience system and/or be configured to permit a user of the application and/or the user device to be authenticated as a driver for a vehicle experience involving a vehicle. In some implementations, the user may have an account associated with the application and/or be required to log into the application via a user credential (e.g., a username, an account identifier, a password, and/or a biometric scan, among other examples), which may serve as a factor (e.g., a first factor) of a multi-factor authentication described herein.

In some implementations, the application may have access to the location management system and/or other location management systems. Accordingly, the application may permit the user to identify or browse an inventory of N vehicles (shown as Vehicle 1 to Vehicle N) that are associated with the location management system. Additionally, or alternatively, the location management system may be accessible through a website (e.g., a dealership website associated with the vehicle location). In this way, the user may initiate a request for a vehicle experience by browsing a vehicle inventory associated with the location management system (and/or vehicle inventories associated with other location management systems) and selecting or identifying a vehicle experience involving a vehicle (e.g., selecting the vehicle for a test drive and/or indicating that the user is interested in test driving the vehicle). Based on a selection of the vehicle and/or the location management system, the user device (and/or the application) may receive, from the user, vehicle information for a vehicle of a vehicle experience.

The user, when initiating the service request, may provide, to the user device and/or the application, driver information associated with the user that may be used to set up a vehicle experience and/or authenticate the user for the vehicle experience, as described herein. Additionally, or alternatively, the user may provide the driver information when setting up an account associated with the application.

As further shown in FIG. 1A, and by reference number 110, the user device transmits the service request to the vehicle experience system. The user device may transmit the service request based on a user input from the user. The user input may cause transmission of the service request. In this way, the user may provide the service request to cause the vehicle experience system and/or the location management system to set up or schedule a vehicle experience involving a selected vehicle (e.g., a particular vehicle from the vehicle inventory of the vehicle location) and/or a vehicle that meets certain criteria that are indicated in the vehicle information provided by the user to the user device. As described herein, the service request may include vehicle information associated with a vehicle and/or driver information associated with the user.

The vehicle information may identify a vehicle characteristic associated with the vehicle. For example, the vehicle information may identify a make and/or model of a vehicle (Vehicle 1 in example implementation 100), a year of manufacture of the vehicle, a vehicle identification number (VIN) of the vehicle, a trim level of the vehicle (or specific features of the vehicle), a type of the vehicle, a location of the vehicle (which may correspond to a location of the vehicle location or an entity that owns or is managing a sale or lease of the vehicle), and/or an identifier of an entity associated with the location management system. In this way, the user device and/or the application may receive vehicle information associated with a vehicle that may be involved in a vehicle experience with the user, as described herein.

The driver information may identify a driver characteristic of the user that may be used to authenticate the user and/or verify that the user may be a qualified driver of the vehicle. For example, the driver information may indicate a name of the user, an age of the user, vehicle preferences of the user (e.g., one or more characteristics of the vehicle that are preferred by the user), and/or other user profile information associated with a vehicle or vehicle experience. In some implementations, the driver information may identify a location of the user (e.g., a current location of the user device and/or a location of a residence of the user). In some implementations, the location of the user may correspond to a desired location for a vehicle experience involving the vehicle. In this way, the user device and/or the vehicle experience system may receive driver information and/or vehicle information for the vehicle experience to permit an agent, associated with the agent device, to authenticate the driver at the location.

In some implementations, the driver information (and/or the service request) may include qualification information that is associated with the user being a qualified driver. For example, the qualification information may include driver license information associated with the user's driver license. The driver license information may include a name of the user on the driver license, an address associated with the user on the driver license, a date of issuance, an expiration date, a unique identification number, a jurisdiction that issued the driver license, and/or a class of vehicles that the user is qualified to drive (e.g., a commercial driver license class or non-commercial driver license class), among other examples. In some implementations, the qualification information may include an image of the driver license (e.g., an image captured by a camera of the user device that depicts the driver license of the user).

The qualification information may include insurance information associated with the user. The insurance information may identify a policy associated with the user operating a vehicle, a policy associated with the user operating a particular class of vehicle, an insurance agency that issued the policy, an issue date or expiration date of the policy, or other insurance information. In this way, the user device and/or the vehicle experience system may receive qualification information associated with the user to permit the user to be qualified for a vehicle experience (e.g., to be qualified to test drive the vehicle).

As further shown in FIG. 1A, and by reference number 115, the vehicle experience system obtains a qualification from the driver qualification source. For example, the vehicle experience system may obtain the qualification based on the driver information and/or the vehicle information. More specifically, the vehicle experience system may obtain the qualification using qualification information.

The driver qualification source may be a system that is configured to validate qualification information associated with a user to qualify the user as a driver for the vehicle experience. For example, the driver qualification source may be associated with a driver database of a jurisdiction that issued the user's driver license. In such a case, the vehicle experience system may obtain, from the driver qualification source, a qualification that indicates that the user is a licensed driver (e.g., based on the driver qualification source validating the driver license information and/or an image of the user's driver license). Additionally, or alternatively, the driver qualification source may be associated with an insurance policy database of an insurance agency that issued an indicated insurance policy in the qualification information. In such a case, the vehicle experience system may obtain, from the driver qualification source, a qualification that indicates that the user is insured to drive the vehicle (e.g., based on the driver qualification source validating that the insurance policy covers the user, a class of the vehicle, and/or the requested vehicle experience).

In this way, the vehicle experience system may obtain one or more qualifications for the user to engage in the vehicle experience system from one or more corresponding driver qualification sources that processed the qualification information. Correspondingly, the vehicle experience system may qualify the user as a driver for the vehicle experience. Therefore, the vehicle experience system may permit the user to be qualified for a vehicle experience without the user having to provide physical documentation and/or identification to an individual (e.g., the agent) at a vehicle location associated with the vehicle.

In some implementations, a driver qualification source may be configured to prequalify the user for a loan from a financial institution related to purchasing the vehicle requested for the service request and/or a vehicle involved in the vehicle experience. The user may interact with the user device to select an option associated with becoming prequalified for the loan. For example, the user device may enable the user to input information associated with becoming pre-qualified for the loan. More specifically, a user interface of the user device may display one or more text input fields through which the user can input information requested by a financial institution (which may be associated with a driver qualification source and/or be one of the driver prequalification sources) to pre-qualify the user for a loan. The user may input the requested information and the user device (e.g., the server device associated with the user interface) may provide the input information to the financial institution. Correspondingly, the vehicle experience system may qualify the user as a driver for the vehicle experience if the driver qualification source (and/or the financial institution) indicates that the driver is prequalified for a loan to purchase the vehicle.

As further shown in FIG. 1A, and by reference number 120, the vehicle experience system generates a verification code. The vehicle experience system may generate the verification code for use in authenticating the driver and/or the vehicle experience, as described elsewhere herein. The vehicle experience system may generate the verification code based on qualifying the driver for the vehicle experience.

The verification code may include an optical code that is configured to be scanned from an output component of the user device via a scanner (e.g., an image capture device, such as a camera) of the agent device. For example, the verification code may include a one-dimensional barcode (e.g., a parallel line code), a two-dimensional barcode (e.g., quick response (QR) code), and/or an animated or dynamic code. Accordingly, the verification code may be used to verify, once the verification code is scanned by the agent device, that the user and the agent are engaging in a vehicle experience, as described elsewhere herein.

The vehicle experience system may generate the verification code using a code generator. The code generator may be associated with the application and/or utilize any suitable encryption technique to generate the verification code. The code generator may be associated with and/or installed on the vehicle experience system or another system. Additionally, or alternatively, the code generator may be locally installed on the user device.

In some implementations, the verification code may be generated based on the driver information associated with the user and/or vehicle information associated with the vehicle. For example, the vehicle experience system may generate the verification code based on a driver characteristic of the user and/or a vehicle characteristic of the vehicle. In some implementations, the vehicle experience system may generate the verification code based on qualification information associated with qualifying the user as a driver for the vehicle experience. Additionally, or alternatively, the vehicle experience system may generate the verification code based on a vehicle characteristic of the vehicle that is identified in the vehicle information. The vehicle experience system may generate the verification code based on a device characteristic associated with the user device (e.g., a device identifier of the user device, account information associated with an account of the application, a location of the user device) and/or a request characteristic associated with the service request (e.g., a time associated with the user requesting the vehicle experience, an agent or vehicle location identified in the service request, and/or the like).

Accordingly, the verification code may be generated as a unique code that is configured specifically for a vehicle experience involving the user and/or the vehicle. More specifically, the verification code may be generated based on an encryption of the driver information or the vehicle information.

As shown in FIG. 1B, and by reference number 125, the vehicle experience system provides the verification code to the user device. The vehicle experience system may provide the verification code based on receiving the qualification of the driver from a driver qualification source that processed the qualification information of the user. In this way, the user device may receive the verification code to permit an agent device to scan the verification code to authenticate the user as a driver of the vehicle experience, as described elsewhere herein.

As further shown in FIG. 1B, and by reference number 130, the vehicle experience system provides vehicle experience information to the location management system. For example, the vehicle experience system may provide the vehicle experience information within a notification that the user requested the vehicle experience involving a vehicle associated with the location management system. The vehicle experience system may provide the notification based on the vehicle information indicating that the vehicle is associated with the location management system.

The vehicle experience system may identify the location management system as being associated with the vehicle and/or the user based on information from the service request. For example, the vehicle experience system may determine that the location management system is associated with the vehicle, based on the vehicle information identifying a VIN of the vehicle and an inventory mapping that indicates that the location management system is associated with the vehicle. Additionally, or alternatively, the vehicle experience system may identify the location management system based on determining, from the inventory mapping, that the location management system is associated with one or more vehicles that satisfy certain criteria of a vehicle identified in the service request. In some implementations, the vehicle experience system may select the location management system, from a plurality of location management systems, to receive the vehicle experience information and/or facilitate a vehicle experience based on the location management system being associated with a vehicle location that is within a certain driving distance of a location of the user.

The vehicle experience information may include information associated with the driver and/or the vehicle to permit the agent to provide or facilitate the vehicle experience, as described elsewhere herein. For example, the vehicle experience information may include a location of the vehicle experience system to permit the agent to meet the user at the location. Additionally, or alternatively, the vehicle experience information may include a VIN of the vehicle and/or requested criteria for a vehicle for the vehicle experience. In this way, the agent may identify the vehicle and/or find a vehicle that meets certain criteria of a vehicle requested by the user in the service request.

As further shown in FIG. 1B, and by reference number 135, the vehicle experience system and/or the location management system schedules the vehicle experience involving the vehicle and/or the agent. For example, the vehicle experience system may interact with the location management system to schedule the vehicle experience during a requested time frame of the user (e.g., as indicated in the service request) and/or an available time frame for the vehicle experience as indicated by the location management system. The location management system may indicate an available time frame for the vehicle experience based on accessing a calendar associated with the vehicle (e.g., a calendar that indicates time frames that the vehicle is available for the vehicle experience) and/or a calendar associated with the agent (e.g., a calendar that indicates an availability of the agent based on a work schedule of the agent and/or scheduled appointments of the agent). In this way, the vehicle experience system and/or the location management system may coordinate to schedule the vehicle experience during a time period that overlaps a time frame requested by the user and an available time frame for the vehicle experience as indicated by the location management system.

As shown in FIG. 1C, and by reference number 140, the agent and user meet for the vehicle experience with the vehicle. For example, the user and/or the agent may arrive at a location for the vehicle experience system that is requested by the user in the service request and/or acknowledged by the agent or location management system. The location may be different from the vehicle location. For example, the location may be a location of the user (e.g., a residence of the user, an employment location of the user, or other location specified by the user). In this way, the user may meet the agent at a location that is convenient to the user, thereby improving the user's experience relative to having to initiate the vehicle experience from the vehicle location (or a location that is more convenient for a dealership).

As further shown in FIG. 1C, and by reference number 145, the user device facilitates a scan of the verification code. For example, the user device may display the verification code via a display device of the user device. In this way, because the verification code is to be displayed within a field of view of a scanner of the agent device, a scan of the verification code may represent an authentication of the user and/or a vehicle experience involving the user as a qualified driver of the vehicle for the vehicle experience.

While certain examples are described herein in connection with a verification code being displayed as an optical code, other types of verification codes may be considered to authenticate a driver for a vehicle experience. For example, an audible code may be emitted from a speaker of the user device so that the agent device can interpret an audio signal from the speaker that includes the audible code.

As further shown in FIG. 1C, and by reference number 150, the agent device scans the verification code. For example, the agent may cause a scanner of the agent device to scan and/or decode the optical code. The scanner may include a barcode scanner and/or an image capture device.

In some implementations, the agent device may decode the verification code by processing scan data from the scanner. For example, the agent device, via an agent-side version of the application, may decode the verification code in association with a decryption technique that corresponds to the encryption technique used by the code generator to generate the verification code. In this way, the agent device may obtain driver information (e.g., driver license information, an image of the user's driver license, qualification information, or a qualification of the user as a driver for the vehicle experience system) associated with the user to permit the agent to authenticate the user as a driver for the vehicle experience.

As further shown in FIG. 1C, and by reference number 155, the agent and/or the vehicle experience system authenticate the vehicle experience. In some implementations, the agent device may provide an authentication request to the vehicle experience system in association with the scan of the verification code. Accordingly, the vehicle experience system may receive the authentication request from the agent device to permit the vehicle experience system to decrypt the scan data according to a decryption technique that corresponds to the encryption technique. In such a case, based on the scan data being associated with a scan of the verification code for the vehicle experience, the vehicle experience system may provide driver information to the agent device to facilitate authentication of the user as a driver for the vehicle experience.

In this way, the user may be authenticated as a driver for the vehicle experience without being an owner of the vehicle (e.g., because the user is indicated as qualified to drive the vehicle according to a qualification from the driver qualification source).

As further shown in FIG. 1C, and by reference number 160, the vehicle experience system manages information associated with the vehicle experience. The authentication request may indicate, to the vehicle experience system, that the user and/or agent are initiating or engaging in the vehicle experience. Accordingly, the vehicle experience system may manage the information associated with the vehicle experience based on receiving the authentication request and/or based on the user being authenticated for the vehicle experience.

In some implementations, the vehicle experience system may monitor information from the user device, the agent device, and/or the vehicle to manage, via a record log, the vehicle experience. The record log may be associated with the user and/or the vehicle (e.g., to maintain a database of vehicles that the user test drove and/or to maintain a database of test drivers of the vehicle). Accordingly, the vehicle experience system may manage the information associated with the vehicle experience by storing, in a record log, the driver information and/or the vehicle information in association with the vehicle experience (e.g., using an entry or record that is identified by an identifier associated with the vehicle experience).

In some implementations, the vehicle experience system may verify which vehicle is involved in the vehicle experience. For example, the vehicle experience system may request and/or receive an identifier (e.g., a VIN) of the vehicle from the agent device (which may have scanned a barcode associated with the VIN, provided the VIN as text, and/or provided an image of the VIN). Accordingly, the vehicle experience system may store the identifier of the vehicle in association with the driver information to confirm that the user and the vehicle were involved in the vehicle experience. Additionally, or alternatively, the vehicle experience system may provide a notification to the user device that verifies that the vehicle is the vehicle that was requested by the user and/or that the vehicle satisfies certain criteria requested by the user via the service request.

In some implementations, the vehicle experience system may request and/or receive feedback from the user, via the user device. The feedback may be associated with the vehicle experience and indicate whether the user test drove the vehicle, whether the vehicle matched the requested vehicle and/or certain criteria indicated in the service request, whether the user was satisfied with certain features of the vehicle or a performance of the vehicle during the vehicle experience, and/or a sentiment of the user relative to the vehicle experience.

Accordingly, as described herein, the vehicle experience system may enable a user (or driver) to engage in a vehicle experience at a desired location of the user while maintaining safety and security of an agent involved in the vehicle experience and/or the vehicle. Accordingly, the vehicle experience system may provide, over other systems, a more convenient vehicle experience for a user, without sacrificing the safety or security of an agent or vehicle. Furthermore, the vehicle experience system may allow for improved efficiency with respect to offering certain vehicle experiences by enabling a user to be accurately qualified as a driver without requiring an in-person or onsite interaction between the user and a seller of a vehicle.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
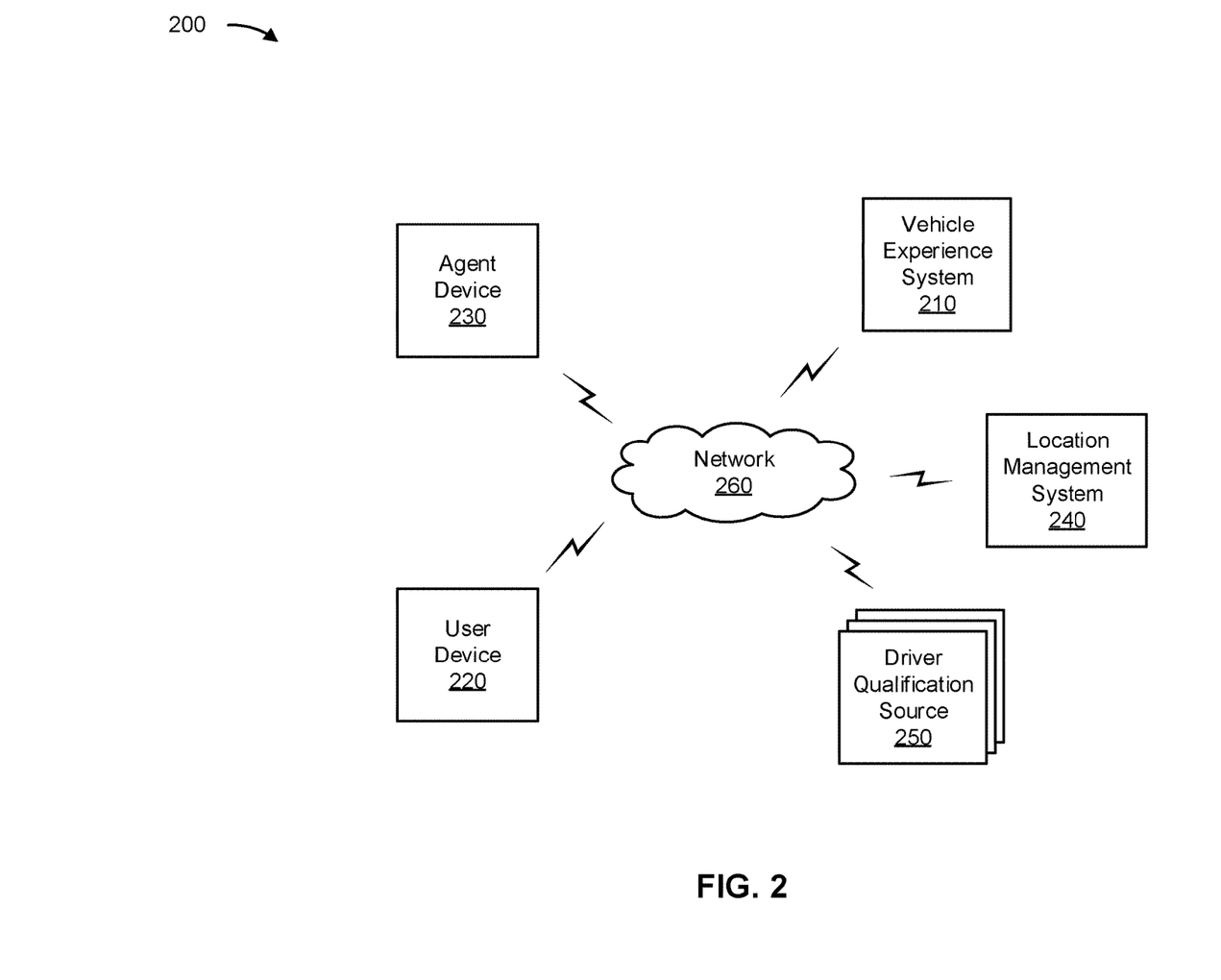
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a vehicle experience system 210, a user device 220, an agent device 230, a location management system 240, a driver qualification source 250, and a network 260. Devices of environment 200 may interconnect via wired connections, wireless connections, or a combination of wired and wireless connections.

The vehicle experience system 210 includes one or more devices capable of receiving, generating, storing, processing, providing, and/or routing information associated with authenticating a driver for a vehicle experience, as described elsewhere herein. The vehicle experience system 210 may include a communication device and/or a computing device. For example, the vehicle experience system 210 may include a server, such as an application server, a client server, a web server, a database server, a host server, a proxy server, a virtual server (e.g., executing on computing hardware), or a server in a cloud computing system. In some implementations, the vehicle experience system 210 includes computing hardware used in a cloud computing environment.

The user device 220 includes one or more devices capable of receiving, generating, storing, processing, and/or providing information associated with a driver requesting and/or facilitating scheduling of a vehicle experience, as described elsewhere herein. The user device 220 may include a communication device and/or a computing device. For example, the user device 220 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The agent device 230 includes one or more devices capable of receiving, generating, storing, processing, and/or providing information associated with facilitating an authentication of a driver for a vehicle experience, as described elsewhere herein. The agent device 230 may include a communication device and/or a computing device. For example, the agent device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The location management system 240 includes one or more devices capable of receiving, generating, storing, processing, providing, and/or routing information associated with a vehicle involved in a vehicle experience, as described elsewhere herein. The location management system 240 may include a communication device and/or a computing device. For example, the location management system 240 may include a server, such as an application server, a client server, a web server, a database server, a host server, a proxy server, a virtual server (e.g., executing on computing hardware), or a server in a cloud computing system. In some implementations, the location management system 240 includes computing hardware used in a cloud computing environment.

The driver qualification source 250 includes one or more devices capable of receiving, generating, storing, processing, providing, and/or routing information associated with qualifying a driver for a vehicle experience, as described elsewhere herein. The driver qualification source 250 may include a communication device and/or a computing device. For example, the driver qualification source 250 may include a server, such as an application server, a client server, a web server, a database server, a host server, a proxy server, a virtual server (e.g., executing on computing hardware), or a server in a cloud computing system. In some implementations, the driver qualification source 250 includes computing hardware used in a cloud computing environment.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
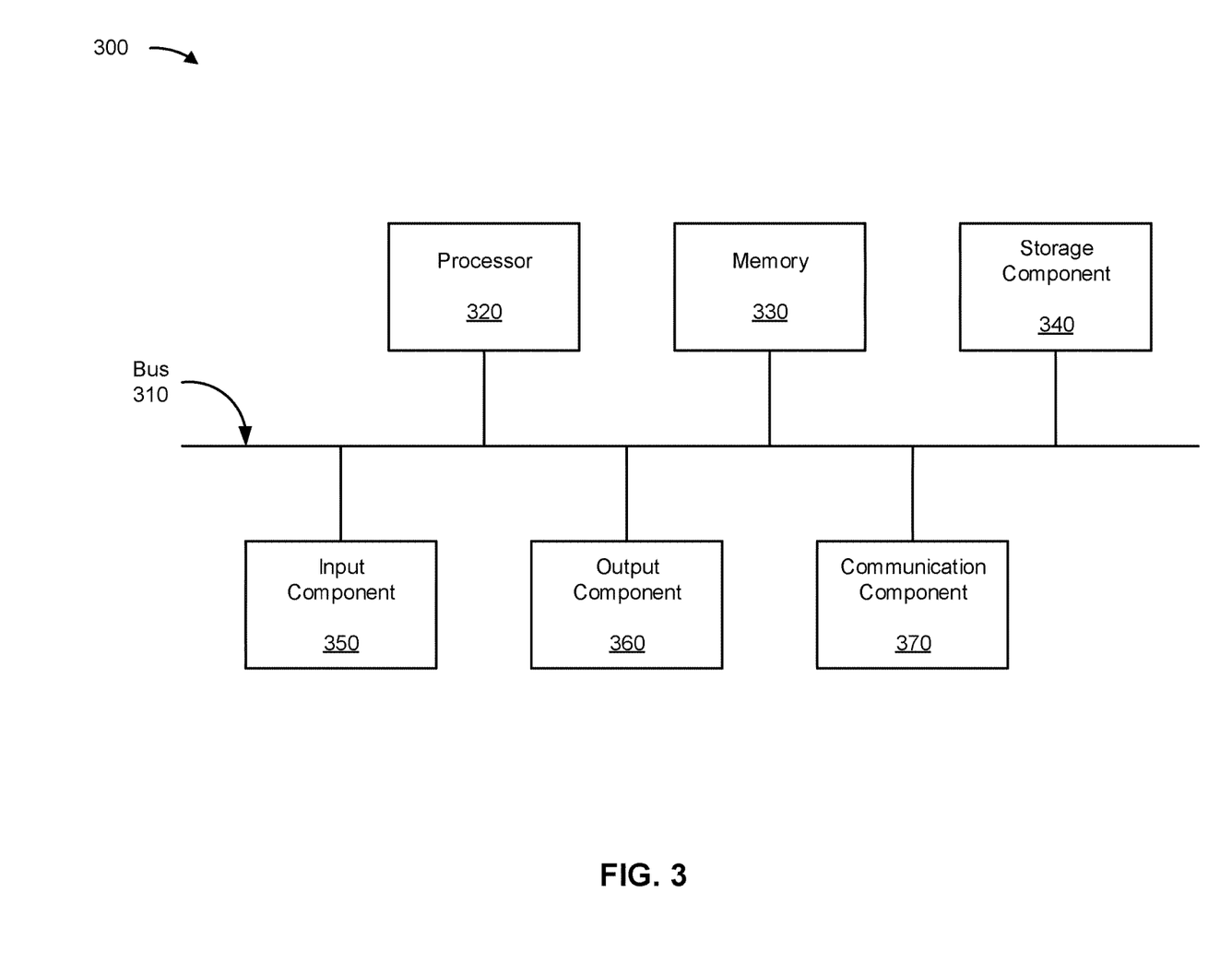
FIG. 3 is a diagram of example components of one or more devices of FIG. 2.

FIG. 3 is a diagram of example components of a device 300, which may correspond to the vehicle experience system 210, the user device 220, the agent device 230, the location management system 240, and/or the driver qualification source 250. In some implementations, the vehicle experience system 210, the user device 220, the agent device 230, the location management system 240, and/or the driver qualification source 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
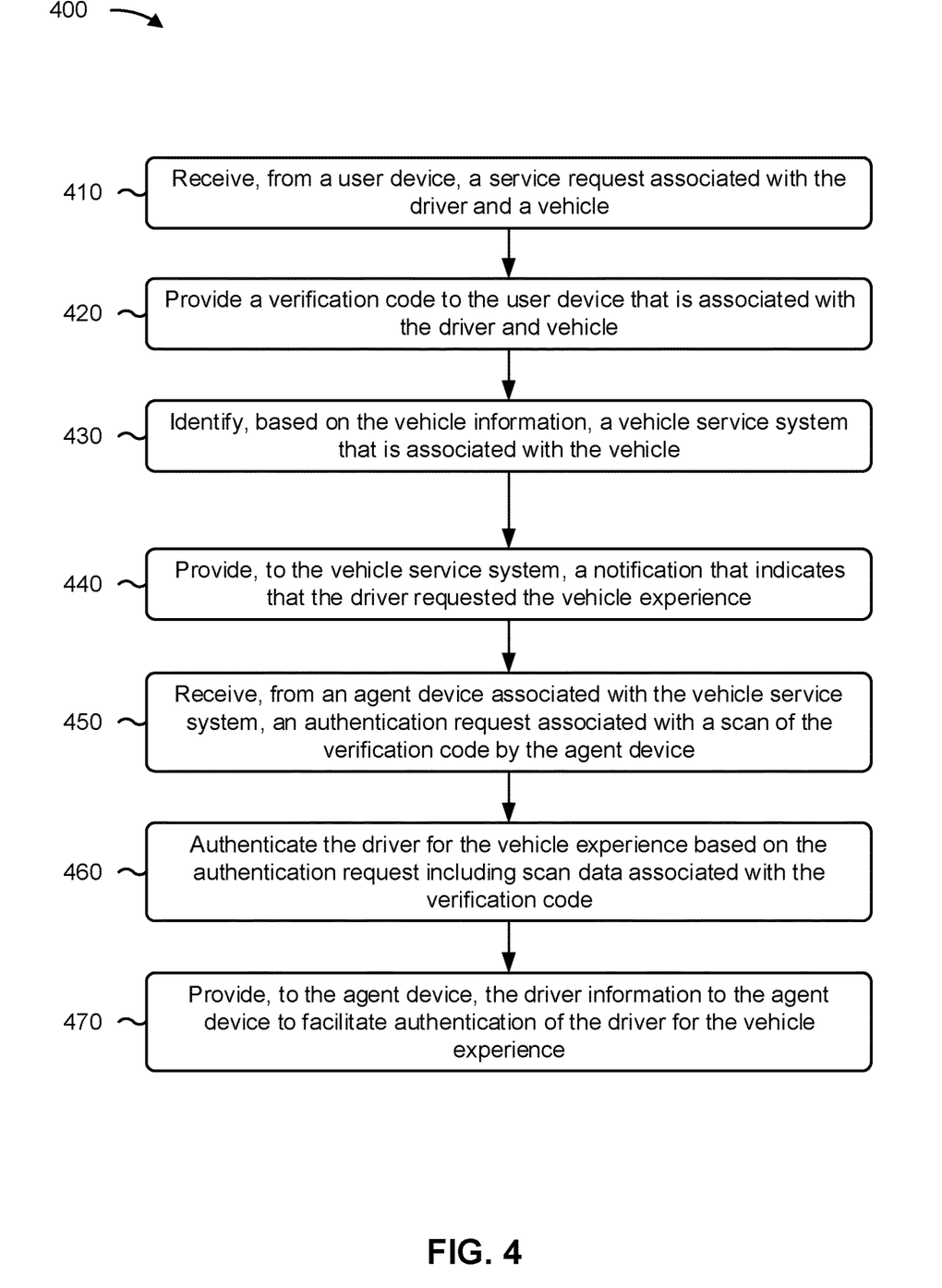
FIG. 4 is a flowchart of an example process relating to authentication of a driver of a vehicle for a vehicle experience.

FIG. 4 is a flowchart of an example process 400 associated with authentication of a driver of a vehicle for a vehicle experience. In some implementations, one or more process blocks of FIG. 4 may be performed by a vehicle experience system (e.g., the vehicle experience system 210). In some implementations, one or more process blocks of FIG. 4 may be performed by another device or a group of devices separate from or including the vehicle experience system, such as a user device (e.g., the user device 220), an agent device (e.g., the agent device 230), a location management system (e.g., the location management system 240), and/or a driver qualification source (e.g., the driver qualification source 250). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a user device, a service request associated with the driver and a vehicle (block 410). The service request may include driver information associated with the driver and vehicle information associated with the vehicle.

As further shown in FIG. 4, process 400 may include providing a verification code to the user device that is associated with the driver and vehicle (block 420). As further shown in FIG. 4, process 400 may include identifying, based on the vehicle information, a location management system that is associated with the vehicle (block 430). As further shown in FIG. 4, process 400 may include providing, to the location management system, a notification that indicates that the driver requested the vehicle experience (block 440). The notification may include the driver information and the vehicle information.

As further shown in FIG. 4, process 400 may include receiving, from an agent device associated with the location management system, an authentication request associated with a scan of the verification code by the agent device (block 450). As further shown in FIG. 4, process 400 may include authenticating the driver for the vehicle experience based on the authentication request including scan data associated with the verification code (block 460). As further shown in FIG. 4, process 400 may include providing, to the agent device, the driver information to the agent device to facilitate authentication of the driver for the vehicle experience (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, the system comprising:
one or more memories; and
one or more processors, coupled to the one or more memories, configured to:
receive, from a user device, a service request associated with a driver and a vehicle experience, wherein the service request includes:
driver information identifying a location for the vehicle experience that is different than a location of a vehicle and a location of the user device, and vehicle information associated with the vehicle;

generate a verification code, for authenticating the driver for the vehicle experience involving the vehicle, based on a driver characteristic included in the driver information and a vehicle characteristic included in the vehicle information;

provide the verification code to the user device;

identify, based on the vehicle information, a location management system managing inventory of an entity associated with the vehicle;

provide, to the location management system, a notification that indicates that the driver requested the vehicle experience,
wherein the notification includes the driver information and the vehicle information;

receive, from an agent device associated with an agent of the entity, an authentication request including scan data associated with a scan of the verification code by the agent device;

authenticate the driver for the vehicle experience based on the scan data; and provide, to the agent device, the driver information to facilitate authentication of the driver for the vehicle experience.

2. The system of claim 1, wherein the verification code is generated based on an encryption of the driver characteristic and the vehicle characteristic.

3. The system of claim 1, wherein the driver information includes qualification information associated with the driver,
wherein the verification code is provided to the user device based on receiving a qualification of the driver from a driver qualification source that processed the qualification information to qualify the driver for the vehicle experience.

4. The system of claim 1, wherein the one or more processors are further configured to:
receive, from the user device, feedback associated with the vehicle experience; and
store, in a record log, the feedback in association with the driver information and the vehicle information.

5. The system of claim 1, wherein the one or more processors are further configured to:
receive, from the agent device, vehicle experience information that includes an identifier of the vehicle; and
provide, to the user device, a notification that verifies that the vehicle experience involves the vehicle.

6. The system of claim 1, wherein the verification code is provided to the user device, and wherein the verification code comprises an optical code that is configured to be displayed on the user device and scanned by the agent device via an image capture device.

7. A non-transitory computer-readable medium storing a set of instructions, the set of instructions comprising:
one or more instructions that, when executed by one or more processors of a device, cause the device to:
receive, from a user device associated with a driver, a service request associated with a vehicle, wherein the service request includes:
driver information identifying a location for a vehicle experience of the vehicle that is different than a location of the vehicle and a location of the user device, and
vehicle information associated with the vehicle;
generate a verification code, for authenticating the driver for the vehicle experience of the vehicle, based on a driver characteristic included in the driver information and a vehicle characteristic included in the vehicle information;

provide, to the user device, the verification code;

provide, to a location management system managing inventory of an entity associated with the vehicle, a notification that indicates that the driver requested the vehicle experience,
wherein the notification is provided to the location management system based on the vehicle information indicating that the vehicle is associated with the location management system;

receive, from an agent device associated with an agent of the entity, scan data associated with a scan of the verification code by the agent device; and provide, to the agent device and based on the scan data, the driver information to the agent device to facilitate authentication of the driver.

8. The non-transitory computer-readable medium of claim 7, wherein the verification code is generated further based on a request characteristic associated with the service request.

9. The non-transitory computer-readable medium of claim 7, wherein the verification code is provided to the user device based on receiving a qualification of the driver based on the driver information.

10. The non-transitory computer-readable medium of claim 7, wherein the driver is authenticated based on a decryption of the scan data indicating that the agent device scanned the verification code.

11. The non-transitory computer-readable medium of claim 7, wherein the one or more instructions further cause the device to:
store, in a record log, the driver information and the vehicle information in association with the vehicle experience.

12. The non-transitory computer-readable medium of claim 7, wherein the vehicle experience comprises a test drive of the vehicle.

13. A method, comprising:
receiving, by a device and from a user device associated with a driver, a service request for a vehicle experience involving a vehicle;
obtaining, by the device and based on driver information in the service request, qualification information associated with the driver,
wherein the driver information identifies a location for the vehicle experience that is different than a location of the vehicle and a location of the user device;
generating, by the device, a verification code, for authenticating the driver for the vehicle experience involving the vehicle, based on the qualification information and at least one of a driver characteristic included in the driver information and a vehicle characteristic associated with the vehicle;
providing, by the device, the verification code;
providing, by the device to a location management system managing inventory of an entity associated with the vehicle, a notification that indicates that the driver requested the vehicle experience,
wherein the notification includes the driver information and vehicle information associated with the vehicle;
receiving, by the device and from an agent device associated with an agent of the entity, scan data of the verification code;
authenticating, by the device and based on the scan data, the driver for the vehicle experience; and providing, by the device and to the agent device, authentication information to the agent device to facilitate authentication of the driver for the vehicle experience.

14. The method of claim 13, wherein the verification code is generated based on the qualification information, the driver characteristic, and the vehicle characteristic.

15. The method of claim 13, wherein the driver is authenticated based on a decryption of the scan data indicating that the agent device scanned the verification code.

16. The method of claim 13, further comprising:
receiving, from the agent device, an identifier of the vehicle; and
storing, in a record log, the identifier in association with the driver information and the vehicle information.

17. The method of claim 13, further comprising:
receiving, from the agent device, vehicle experience information that includes an identifier of the vehicle; and
providing, to the user device, a notification that verifies that the vehicle experience involves the vehicle.

18. The method of claim 13, wherein the driver is authenticated for the vehicle experience without being an owner of the vehicle.

19. The system of claim 1, wherein, to provide the notification, the one or more processors are configured to:
provide, to the location management system, an indication of an available time frame for the vehicle experience based on accessing a calendar that indicates a time frame that the vehicle is available.

20. The method of claim 13, wherein providing the notification comprises:
providing, to the location management system, an indication of an available time frame for the vehicle experience based on accessing a calendar that indicates a time frame that the vehicle is available.

* * * * *